United States Patent
Kettle, Jr. et al.

[11] Patent Number: 6,017,098
[45] Date of Patent: Jan. 25, 2000

[54] BRAKE PIPE CONTROL PORTION TO ENHANCE OPERATION UNDER LOW MAIN RESERVOIR PRESSURE CONDITIONS

[75] Inventors: Paul J. Kettle, Jr., Ijamsville, Md.; Ralph Santoro, Jr., New Kensington, Pa.

[73] Assignee: Westinghouse Air Brake Company, Wilmerding, Pa.

[21] Appl. No.: 09/038,176

[22] Filed: Mar. 10, 1998

[51] Int. Cl.[7] .................................................. B60T 11/34
[52] U.S. Cl. ................................. 303/33; 303/3; 303/83; 303/86
[58] Field of Search .................................. 303/3, 15, 33, 303/38, 77, 81, 82, 83, 86

[56] References Cited

U.S. PATENT DOCUMENTS

| | | | |
|---|---|---|---|
| 5,326,159 | 7/1994 | Hart et al. | 303/86 |
| 5,358,315 | 10/1994 | Balukin | 303/15 |
| 5,390,988 | 2/1995 | Shank | 303/15 |
| 5,393,129 | 2/1995 | Troiani et al. | 303/15 |
| 5,503,467 | 4/1996 | Gaughan | 303/3 |
| 5,511,860 | 4/1996 | Wallestad et al. | 303/86 |
| 5,564,794 | 10/1996 | Hart | 303/15 |
| 5,676,431 | 10/1997 | McLaughlin et al. | 303/15 |
| 5,730,504 | 3/1998 | Gaughan | 303/3 |
| 5,746,484 | 5/1998 | Gaughan et al. | 303/3 |
| 5,924,774 | 7/1999 | Cook et al. | 303/3 |

*Primary Examiner*—Chris Schwartz
*Attorney, Agent, or Firm*—James Ray & Associates

[57] ABSTRACT

A brake pipe control apparatus of the type that defines primary and control passage networks has been improved. The primary passage network interconnects the brake pipe to at least one pneumatic valve in the apparatus. The control passage network interconnects a source of control pressure to at least one magnet valve used to cause operation of the pneumatic valve(s). The improvement includes first and second check valves and a passageway added between the two passage networks. The first check valve is incorporated into the control passage network between an inlet channel thereof that connects to the source and a branched channel thereof that connects to the magnet valve(s). The first check valve is situated to prevent air from flowing to the source from the branched channel when pressure in the source is low relative to pressure in the branched channel. The passageway interconnects the branched channel and the primary passage network. Placed into the passageway, the second check valve is situated to allow air to flow from the primary passage network to the branched channel when pressure in the source is low relative to pressure in the brake pipe. Pressure is thus maintained in the branched channel thereby allowing the magnet valve(s) during operation thereof to cause proper operation of the pneumatic valve(s) of the apparatus even if the source fails to provide air at the control pressure ordinarily expected.

18 Claims, 3 Drawing Sheets

BRAKE PIPE CONTROL PORTION TO ENHANCE OPERATION UNDER LOW MAIN RESERVOIR PRESSURE CONDITIONS

FIELD OF THE INVENTION

The present invention generally relates to brake control equipment for a train. More particularly, the present invention pertains to an improved brake pipe control device for a pneumatic operating unit of a locomotive.

BACKGROUND OF THE INVENTION

A typical train includes one or more locomotives, a plurality of railcars and several trainlines. The trainlines include both pneumatic and electrical lines most of which run from the lead locomotive to the last railcar in the train. One pneumatic trainline is the brake pipe. The brake pipe consists of a series of individual pipe lengths each of which secured to the underside of one railcar. Each pipe length is interconnected to another such pipe length via a flexible coupler situated between each railcar. Usually controlled so as to mimic the pressure contained in a storage tank called the equalizing reservoir, the brake pipe is thus one long continuous pipe that runs from the lead locomotive to the last railcar. The brake pipe supplies the pressurized air that is required by the brake control system to charge the various reservoirs and operate the brake control valves of each railcar in the train.

In a locomotive, the pneumatic trainlines include an actuating pipe, a main reservoir equalizing (MRE) pipe, and an independent application and release (IAR) pipe, in addition to the brake pipe. Within a locomotive consist (i.e., two or more locomotives connected together), the MRE, actuating and IAR pipes of each locomotive connect to the MRE, actuating and IAR pipes of adjacent locomotives. The IAR pipe supplies the compressed air that can be used to control the delivery of pressurized air to, and thus to operate, the air brakes of each locomotive in the train.

The brakes of a train, whether on railcars or locomotives, are applied using brake cylinders and associated components. During braking, the brake cylinders convert the pressurized air that they receive to mechanical force. From the brake cylinders this force is transmitted by mechanical linkage to the brake shoes. When the brakes are applied, it is the brake shoes that are ultimately used to slow or stop the rotation of the wheels on every vehicle in the train.

A typical locomotive has a brake control system such as any one of the various EPIC® Brake Equipment Systems produced by the Westinghouse Air Brake Company (WABCO). These brake control systems generally include a cab station unit, a keyboard, a display, a locomotive interface unit, a brake control computer and a pneumatic operating unit. The cab station unit generates various signals including those representing the positions of the automatic and independent brake handles, and conveys commands corresponding thereto to the brake control computer. The keyboard also permits a train operator to access the brake equipment, allowing, for example, the operator to input certain set-up parameters. The display allows the operation of the brake equipment to be monitored. The locomotive interface unit (LIU) connects electrical power and certain trainlines to the brake equipment and provides various signals to the brake control computer. Based on the inputs it receives and the software that dictates its operation, the brake control computer essentially controls the overall operation of the brakes. Shown in FIG. 1, the pneumatic operating unit (POU) controls the pressures in the pneumatic trainlines and in various reservoirs so as to control the brakes according to commands received from the brake control computer.

The POU features a pneumatic laminate to which the brake control computer and various pneumatically and electropneumatically operated devices mount. The design of the laminate allows these components to be removed for repair and maintenance without disturbing the piping or wiring of the locomotive. Through a number of ports and internal passages, the pneumatic laminate interconnects these devices to each other and to branch pipes that carry air from or to the actuating pipe, the MRE pipe, the IAR pipe, the brake pipe, the brake cylinder and/or various storage tanks such as the equalizing reservoir. It is through the ports and internal passages of the pneumatic laminate that these devices communicate fluidly with each other and the pneumatic pipes on the train.

Among the various devices mounted to the pneumatic laminate are the independent application and release (IAR) portion, the brake cylinder (BC) control portion and the brake pipe (BP) control portion shown in FIG. 1. These operating portions of the POU are primarily controlled by the brake control computer. The IAR portion features pneumatic logic circuitry along with solenoid operated valves by which the pressure in both the actuating and IAR pipes can be controlled. The BC control portion also features pneumatic logic circuitry along with solenoid operated valves by which the pressure in the brake cylinders on the locomotive can be controlled. The BC control portion controls the pressure in the locomotive brake cylinders in response to the commands generated by movement of either of the two brake handles. These automatic and independent brake demand signals may also be generated by pressure changes in the brake pipe, the IAR pipe, the back-up brake or the penalty brake circuitry. The BP control portion uses pneumatic logic circuitry and solenoid operated valves by which the pressure within the brake pipe throughout the entire train can be controlled. The BP control portion also controls the emergency venting and the brake pipe cut-off functions as described in further detail below.

The cab station unit generally includes a handle unit and a cab control unit. The handle unit houses the two brake handles and related components. The cab control unit essentially has a computer and a cab interface card. From the handle unit the cab control computer receives via the interface card the signals indicative of the positions of the automatic and independent brake handles. Based on these inputs, the cab control computer calculates commands representative of how much, or even if, the braking effort should be reduced. Along with other information, the cab control computer then conveys these commands to the brake control computer.

The automatic brake handle is the device that the train operator can manipulate to direct the brake equipment to apply and release the brakes on each locomotive and each railcar of the train. The level to which the brake equipment reduces or increases pressure within the brake pipe, and thus the amount of braking power exerted by the train brakes, corresponds to the position of the automatic brake handle. The independent brake handle, in contrast, allows the train operator to apply and release the brakes only on each locomotive.

The independent brake handle may be moved between and placed within any of two positions. When the independent brake handle is moved to its apply position, the brake control computer commands the IAR portion to increase pressure within the IAR pipe. The BC control portion responds pneumatically to this increase in IAR pipe pressure by directing air from the main reservoir to the brake cylinders of the locomotive to apply fully the locomotive brakes. Similarly, when the independent brake handle is moved to its release position, the brake control computer commands the IAR portion to reduce pressure within the IAR pipe. Responding pneumatically to the decrease in IAR pipe pressure, the BC control portion now vents air from the brake cylinders to release the locomotive brakes. Pressure in the IAR pipe and the locomotive brake cylinders reduces and increases in proportion to the position of the independent brake handle.

The automatic brake handle can be moved from and in between a release position at one extreme in which brake pipe pressure is maximum and the brakes are completely released to an emergency position at another extreme in which brake pipe pressure is zero and the brakes are fully applied. When the brakes are released, the equalizing reservoir and the brake pipe are generally charged to the same pressure: typically 90 psi on a freight train and 110 psi on a passenger train. When the brakes are applied, reduction of the pressure in the brake pipe is generally controlled from the lead locomotive. The exact amount by which the pressure is reduced depends into which of the application positions the brake handle is placed. It is this reduction in brake pipe pressure that signals the brake control valve on each railcar to supply pressurized air from the appropriate reservoir(s) to the brake cylinders to apply the brakes of the railcars. The automatic brake handle positions thus include release, minimum service, full service, suppression, continuous service and emergency. Between the minimum and full service positions lies the service zone wherein each incremental movement of the handle toward the full service position causes an incremental reduction in brake pipe pressure.

When the automatic brake handle is moved to its release position, the brake control computer commands the BP control portion to increase pressure within the equalizing reservoir and the brake pipe. Responding pneumatically to the resulting increase in brake pipe pressure, the brake control valves on each railcar then vent air from the brake cylinders to release completely the railcar brakes. The BC control portion also responds pneumatically to the increase in brake pipe pressure by venting air from the brake cylinders of the locomotive. Moving the automatic brake handle to its release position also causes the brake control computer to command electrically the solenoid valves of BC control portion to depressurize the locomotive brake cylinders. The BC control portion thus can release the locomotive brakes by responding to either electrical commands or pneumatic commands or both, the former issued by the brake control computer and the latter being the increase in brake pipe pressure.

When the automatic brake handle is moved to its minimum service position, the brake control computer commands the BP control portion to reduce pressure within the equalizing reservoir by approximately 6 to 7 psi, irrespective of the brake pipe pressure. This prepares the brake control system for a somewhat quicker application of the train brakes than would be possible from the release position. Moving the automatic brake handle into the service zone even up to the full service position causes the pressure in the equalizing reservoir to reduce further, though in a manner corresponding to handle position. The BP control portion reduces the brake pipe pressure accordingly thereby enabling the brake control valves on the railcars to apply the railcar brakes. Meanwhile, pressure transducers provide electrical signals indicative of the current pressures in the equalizing reservoir and brake pipe to the brake control computer. Based in part on these signals, the brake control computer then commands the BC control portion to direct air from the main reservoir to the locomotive brake cylinders to apply the locomotive brakes.

Moving the automatic brake handle beyond the full service position toward the suppression position causes no additional reduction in the pressure in the equalizing reservoir or brake pipe. When the automatic brake handle is moved beyond the suppression position, the BP control portion reduces the equalizing reservoir pressure at a service rate that corresponds approximately to handle position. Placing the automatic brake handle in the continuous service position causes the equalizing reservoir to reduce to zero at a service rate. Moving the automatic brake handle back into the service zone causes the BP control portion to assume a lap state in which the pressure within the equalizing reservoir and brake pipe is held at the existing level. The BC control portion also can assume a lap state in which the pressure in the locomotive brake cylinders can be maintained at the current pressure level.

When the automatic brake handle is moved into the emergency position, the brake equipment energizes two emergency magnet valves located in the BP control portion. Described in greater detail below, one emergency magnet valve is energized by the brake control computer whereas the other emergency magnet valve is energized directly by a microswitch that closes when the automatic brake handle is moved into its emergency position. Through these two emergency magnet valves, the BP control portion vents the brake pipe to atmosphere at an emergency rate so as to apply the train brakes quickly and fully.

Depending on which of the WABCO EPIC® Brake Equipment Systems one considers, either the keyboard or the handle unit features several keys through which the train operator can select the mode in which the locomotive is operated. In the LEAD CUT-IN mode, the brake control computer permits the locomotive operator to direct control of the train through both the automatic and the independent brake handles. This gives the operator control over the brakes of both the locomotive(s) and the railcars. In the LEAD CUT-OUT mode, the brake control computer permits the locomotive operator to direct control only through the independent brake handle. This gives the operator control over the brakes of the locomotive(s) only. In the TRAIL mode, both brake handles are rendered inoperable except for the emergency position. In a locomotive consist, the brake equipment of one locomotive operating in the TRAIL mode is essentially subservient to the brake equipment of another locomotive operating in either of the LEAD modes. As described more fully below, the operation of the BP control portion is affected by the mode in which the locomotive is operated.

The foregoing background information is provided to assist the reader to understand the invention described and claimed below. Accordingly, any terms used herein are not intended to be limited to any particular narrow interpretation unless specifically stated otherwise in this document.

OBJECTIVES OF THE INVENTION

It is, therefore, a primary objective of the invention to improve the control of pressure within the brake pipe of a train even when the pressure within the main reservoir of the train locomotive is low relative to the brake pipe pressure.

Another objective of the invention is to improve the reliability of, and enhance the operation of various features of, a brake pipe control portion of a pneumatic operating unit for a locomotive of a train.

Yet another objective of the invention is to improve the overall reliability of brake control equipment on a train.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the following drawings and claims.

SUMMARY OF THE INVENTION

In a presently preferred embodiment, the invention provides an improvement to a brake pipe control device of the type that defines a primary passage network and a control passage network. The primary passage network interconnects the brake pipe to at least one pneumatic valve housed in the brake pipe control device. The control passage network interconnects a source of control pressure to at least one magnet valve used to cause operation of the pneumatic valve(s). The improvement includes a first check valve, a second check valve and a connective passageway added between the control passage network and the primary passage network. The first check valve is incorporated into the control passage network between an inlet channel thereof that connects to the source and a branched channel thereof that connects to the magnet valve(s). The first check valve is disposed to prevent air from flowing to the source from the branched channel when pressure in the source is low relative to pressure in the branched channel. The connective passageway interconnects the branched channel and the primary passage network. Placed into the connective passageway, the second check valve is disposed to allow air to flow from the primary passage network to the branched channel when pressure if the source is low relative to pressure in the brake pipe. This improvement maintains the pressure in the branched channel thereby allowing the magnet valve(s) during operation thereof to cause proper operation of the pneumatic valve(s) of the brake pipe control device even if the source fails to provide air at the control pressure ordinarily expected.

DETAILED DESCRIPTION OF THE INVENTION

Figure 1:
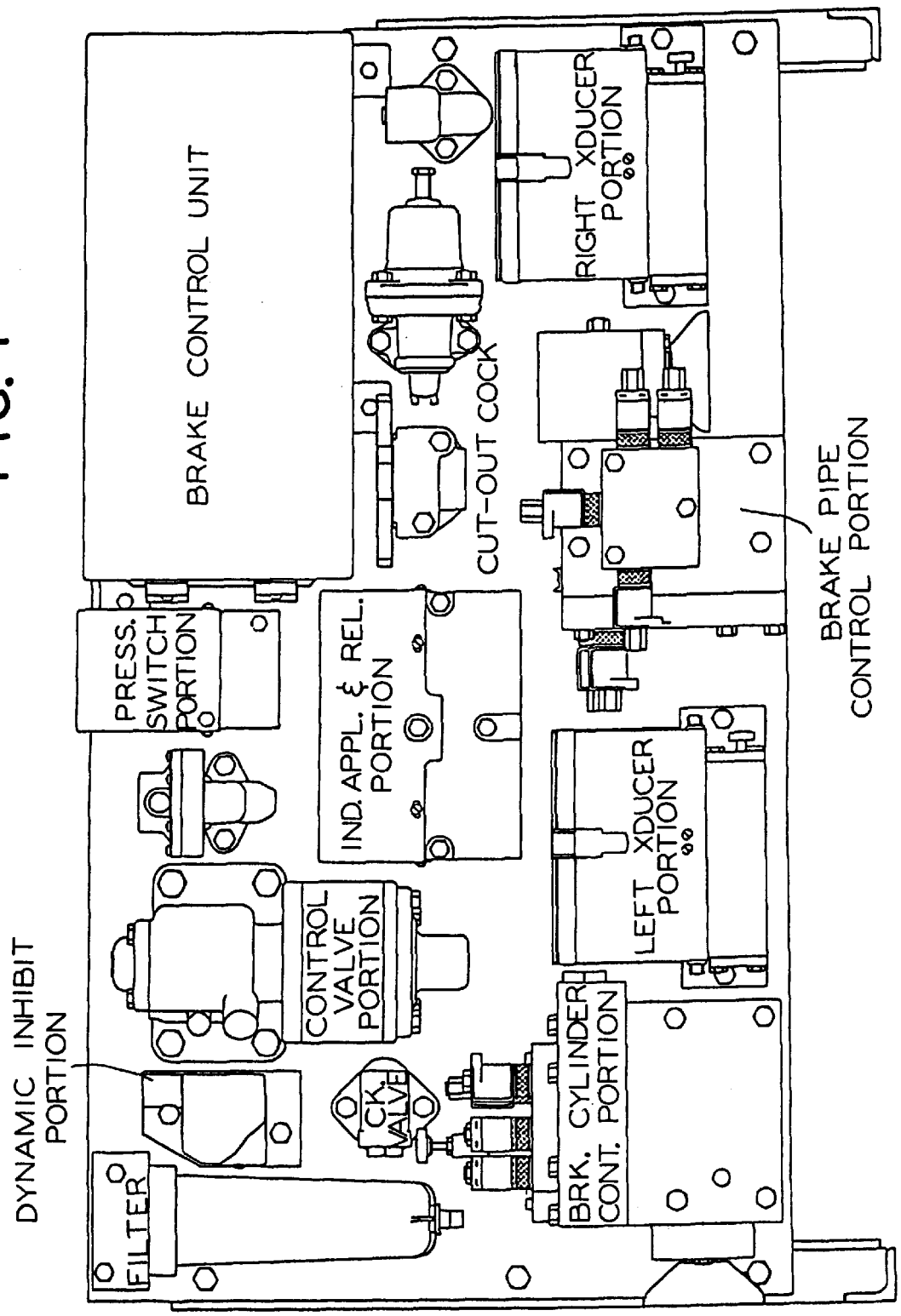
FIG. 1 is a front view of a pneumatic operating unit showing a brake control computer and a brake pipe control portion whose operation the brake control computer controls.

Before describing the invention in detail, the reader is advised that, for the sake of clarity and understanding, where possible identical components having identical functions have been marked with the same reference numerals in each of the Figures provided in this document.

Figure 2:
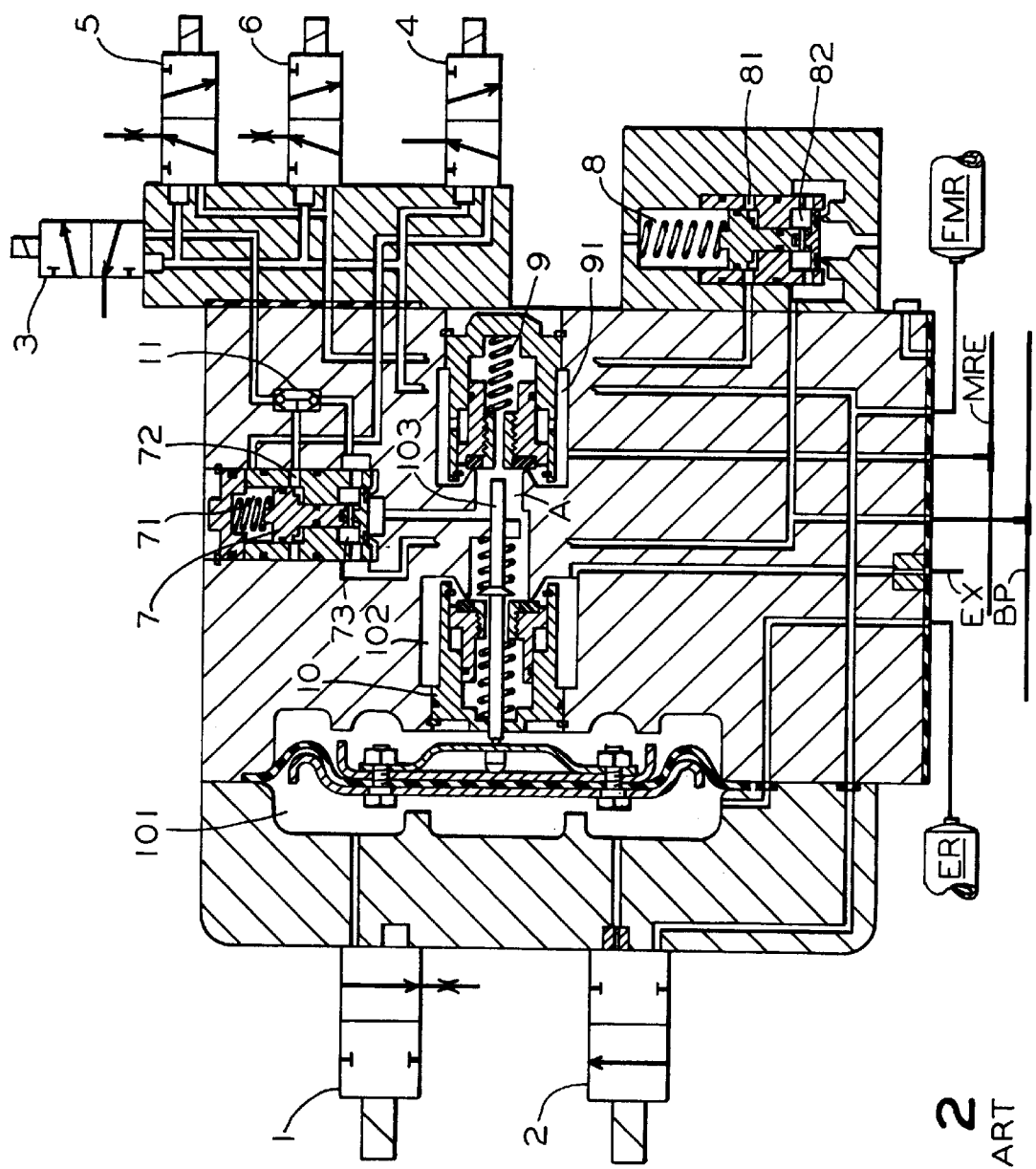
FIG. 2 is a cross sectional view of a prior art brake pipe control portion.

FIG. 2 illustrates a brake pipe (BP) control portion of a pneumatic operating unit through which to control the pressure within the brake pipe throughout a train. This BP control portion is a known device whose construction and operation is shown and explained in Operation & Maintenance Manual Document No. 4208-32, Rev. Date August, 1996, published by WABCO and incorporated herein by reference.

The BP control portion typically employs six magnet valves and four pneumatic valves. The magnet valves include application and release magnet valves 1 and 2, cut-in and cut-out magnet valves 3 and 4 and two emergency magnet valves 5 and 6. The pneumatic valves include a charging cut-off valve 7, an emergency vent valve 8, a supply valve 9 and an exhaust valve 10. It is through these pneumatic valves, as controlled by the magnet valves, that air is supplied to or vented from the brake pipe of the train.

Among other internal pneumatic routes, the BP control portion defines several passages as shown in FIG. 2. Best described in terms of networks, these passages include a primary passage network and a control passage network. As described in greater detail below, the primary passage network is essentially a web of interconnected passages that is used to interconnect the brake pipe BP to certain chambers of the pneumatic valves. Similarly, the control passage network is used to interconnect the magnet valves to a source of control pressure such as the filtered air supplied by the main reservoir (FMR) of the locomotive. (As alluded to in the background section of this document, the BP control portion itself does not directly connect to the named pneumatic pipes and reservoirs of the train. Only indirectly—through the ports and internal passages of the pneumatic laminate and various branch pipes leading thereto—does the BP control portion communicate fluidly with the named pneumatic pipes and reservoirs.)

The aforementioned magnet valves are each two-position magnet valves controlled by either the brake control computer (not shown) or other known control components. The application magnet valve (AMV) 1 connects at its exhaust port to atmosphere and at its output port to the equalizing reservoir (ER) control chamber 101 located adjacent the underside of the diaphragm operated exhaust valve 10. The release magnet valve (RMV) 2 connects at its input port to the filtered main reservoir (FMR) via the control passage network and at its output port to the ER control chamber 101. The cut-in magnet valve (CIMV) 3 connects at its input port to the control passage network and at its output port to a first inlet of double check valve 11. The cut-out magnet valve (COMV) 4 connects at its input port to the control passage network and at its output port to a closing chamber 71 of charging cut-off valve 7. The first emergency magnet valve (EMV1) 5 connects at its input port to the control passage network and at its output port to an opening chamber 81 of emergency vent valve 8. Likewise, the second emergency magnet valve (EMV2) 6 connects at its input port to the control passage network and at its output port to the opening chamber 81 of emergency vent valve 8.

Regarding the operation of the BP control portion when the train operator chooses to operate the locomotive in the LEAD CUT-IN mode, the brake control computer energizes the CIMV 3 and deenergizes the COMV 4. The COMV 4 via its output port then allows closing chamber 71 of charging cut-off valve 7 to vent to atmosphere. Meanwhile, the CIMV 3 allows FMR air via the control passage network to flow to the first inlet of double check valve 11. Air from the brake pipe BP is also able to flow through the primary passage network through vent chamber 73 of charging cut-off valve 7 to the second inlet of double check valve 11. Whichever of the FMR and BP air streams exhibits the greater pressure, double check valve 11 directs the higher pressure air through its outlet to the opening chamber 72 of charging cut-off valve 7. If this pressure is sufficient to overcome the spring bias of charging cut-off valve 7, valve 7 assumes the cut-in position (not shown) in which the brake pipe BP via the primary passage network and vent chamber 73 is in communication with intermediate chamber A situated between the supply and exhaust valves 9 and 10.

When the automatic brake handle is moved to its release position, the brake control computer energizes both the AMV 1 and the RMV 2. The AMV 1 in its energized state disconnects its output port from its exhaust port thereby preventing air in the ER control chamber 101 from escaping to atmosphere. Meanwhile, the RMV 2 allows FMR air via the control passage network to flow into the ER control chamber 101 of exhaust valve 10. Consequently, as pressure builds in the ER control chamber 101, the pressure builds in the equalizing reservoir (ER) via the ER pipe. This pressure build up causes the exhaust valve 10 to move further to the right so as to unseat via valve stem 103 supply valve 9. Air from the MRE pipe of the locomotive is then able to flow through supply chamber 91 of supply valve 9 through chamber A and into charging cut-off valve 7. As the locomotive is operating in the LEAD CUT-IN mode, valve 7 is open so the air from the MRE pipe continues flowing through vent chamber 73 via the primary passage network into the brake pipe BP. Pressure in the brake pipe thus rises along with the pressure in the equalizing reservoir.

Responding pneumatically to the resulting increase in brake pipe pressure, the brake control valves on each railcar then vent air from the brake cylinders to release completely the railcar brakes. As described earlier, the BC control portion also releases the locomotive brakes by responding both pneumatically to the increase in brake pipe pressure and electrically (via solenoid operated valves) to the ensuing commands issued by the brake control computer.

Should the automatic brake handle then be moved into its full service position or any other position between minimum and continuous service, the brake control computer deenergizes both the AMV 1 and the RMV 2. The AMV 1 in its deenergized state connects its output port to its exhaust port thereby allowing air in the ER control chamber 101 to escape to atmosphere. Meanwhile, the RMV 2 disconnects its input port from its output port thereby preventing FMR air via the control passage network from flowing into the ER control chamber 101. Consequently, as pressure drops in the ER control chamber 101, the pressure drops in the equalizing reservoir via the ER pipe. This pressure drop causes the exhaust valve 10 to move back to the left so as to seat supply valve 9 (shown) and unseat itself (not shown). With supply valve 9 closed, this prevents air from the MRE pipe from flowing through supply chamber 91 of supply valve 9 into chamber A. With exhaust valve 10 open, air is able to flow from the brake pipe via the primary passage network into vent chamber 73 of charging cut-off valve 7. The air from the brake pipe continues flowing through intermediate chamber A and the exhaust chamber 102 of exhaust valve 10 to atmosphere via the exhaust port EX of the BP control portion. Pressure in the brake pipe thus drops along with the pressure in the equalizing reservoir.

Responding pneumatically to the resulting decrease in brake pipe pressure, the brake control valves on each railcar then supply pressurized air from the appropriate reservoir(s) to the brake cylinders to apply the railcar brakes. As described earlier, pressure transducers provide signals indicative of the current pressures in the equalizing reservoir and brake pipe to the brake control computer. Based in part on these signals, the brake control computer then commands the BC control portion to direct air (via solenoid operated valves) from the main reservoir to the locomotive brake cylinders to apply the locomotive brakes.

When the equalizing reservoir pressure has reached the level corresponding to the position of the automatic brake handle, or upon moving the handle back into the service zone from the continuous service position, for example, causes the brake control computer to reenergize the AMV 1. The AMV 1 thus again disconnects its output port from its exhaust port thereby preventing air in the ER control chamber 101 from escaping to atmosphere. The RMV 2, still deenergized, prevents FMR air via the control passage network from flowing into the ER control chamber 101. Consequently, the pressure is held constant in ER control chamber 101 as well as in the equalizing reservoir via the ER pipe. Exhaust valve 10 remains open as long as the pressure of the air flowing from the brake pipe BP (via the primary passage network, vent chamber 73, chamber A and exhaust chamber 102 to the exhaust port EX) overcomes the opposing bias of exhaust valve 10. The overall bias of the exhaust valve 10, however, is selected so that the exhaust valve 10 closes once the brake pipe pressure drops to match that in the equalizing reservoir. The BP control portion thus assumes a lap state in which the pressure within the equalizing reservoir and brake pipe is held at the existing level.

Responding to this constant brake pipe pressure, the brake control valves on each railcar also assume a lap state in which the force with which the railcar brakes are applied is held constant. The BC control portion follows by assuming a lap state in which the pressure in the locomotive brake cylinders is also held at the then existing pressure level.

Should the automatic brake handle be moved into its emergency position, the BP control portion is controlled in essentially the same way as it is when the automatic brake handle is placed in its continuous service position. In addition, the cab control computer conveys to the brake control computer the emergency command, i.e., the signal indicating that the automatic brake handle has been placed in the emergency position. The brake control computer responds by immediately energizing the EMV1 5. The EMV1 5 in its energized state connects its input and output ports thereby allowing FMR air via the control passage network to flow to the opening chamber 81 of emergency vent valve 8. Placing the automatic brake handle into its emergency position also closes a microswitch (not shown). When closed, the microswitch energizes the EMV2 6. Like the EMV1, the EMV2 6 in its energized state connects its input and output ports thereby allowing FMR air via the control passage network to flow to the opening chamber 81 of emergency vent valve 8. This quick pressure build up in opening chamber 81 causes the emergency vent valve 8 to open thereby venting the brake pipe pressure to atmosphere. During an emergency, the BP control portion thus responds by dropping the brake pipe pressure at an emergency rate.

Responding pneumatically to the precipitous drop in brake pipe pressure, the brake control valves on each railcar quickly supply pressurized air to the brake cylinders thereby applying the railcar brakes. The BC control portion responds as well by directing air from the main reservoir to the locomotive brake cylinders thereby quickly applying the locomotive brakes.

Regarding the operation of the BP control portion when the train operator chooses to operate the locomotive in the LEAD CUT-OUT mode, the brake control computer deenergizes the CIMV 3 and energizes the COMV 4. The CIMV 3 in its deenergized state connects its output port to its exhaust port thereby venting the first inlet of double check valve 11 to atmosphere. The opening chamber 72 of charging cut-off valve 7 thus receives air from the brake pipe BP (via the second inlet of double check valve 11, vent chamber 73 and the primary passage network). Meanwhile, the COMV 4 connects its input and output ports thereby allowing FMR air via the control passage network to flow to the closing chamber 71 of charging cut-off valve 7. Along with the spring bias of charging cut-off valve 7, the pressure exhibited by FMR air stream forces charging cut-off valve 7 to close. Charging cut-off valve 7 thus assumes the cut-out position, as shown in FIG. 2, in which the brake pipe BP no longer communicates with chamber A situated between the supply and exhaust valves 9 and 10.

Operating the locomotive in the LEAD CUT-OUT mode prevents the BP control portion from affecting the pressure within the brake pipe as long as the automatic brake handle lies outside of its emergency position. Because the charging cut-off valve 7 is closed when the locomotive is operating in the LEAD CUT-OUT mode, the brake pipe BP cannot communicate with chamber A situated between the supply and exhaust valves 9 and 10. Consequently, the brake pipe BP can neither be exhausted (via exhaust port EX) nor charged (via the MRE pipe connection). Moving the automatic brake handle anywhere between and including the release and the continuous service positions thus has no effect on the pressure within the brake pipe.

When the automatic brake handle is moved into the emergency position, the BP control portion will affect brake pipe pressure even though its charging cut-out valve 7 is in the cut-out position. As alluded to previously, the cab control computer conveys to the brake control computer the emergency command. The brake control computer responds by immediately energizing the EMV1 5. Moving the automatic brake handle into the emergency position also closes the microswitch thereby energizing the EMV2 6. The EMV1 5 and EMV2 6 in their energized states each connects its input and output ports thereby allowing FMR air via the control passage network to flow to the opening chamber 81 of emergency vent valve 8. The pressure build up in opening chamber 81 causes the emergency vent valve 8 to open thereby venting the brake pipe pressure to atmosphere.

Responding pneumatically to the precipitous drop in brake pipe pressure, the brake control valves on each railcar quickly supply pressurized air to the brake cylinders thereby applying the railcar brakes. The BC control portion responds as well by directing air from the main reservoir to the locomotive brake cylinders thereby quickly applying the locomotive brakes.

The construction and operation of the BP control portion has been described herein to the extent necessary to understand the environment in which the present invention operates. It should be understood, however, that this is merely a brief and simplified explanation of how this operating portion works. A more detailed explanation of the operation of the BP control portion can be found in the aforementioned Operation & Maintenance Manual Document published by WABCO, previously incorporated herein by reference.

Figure 3:
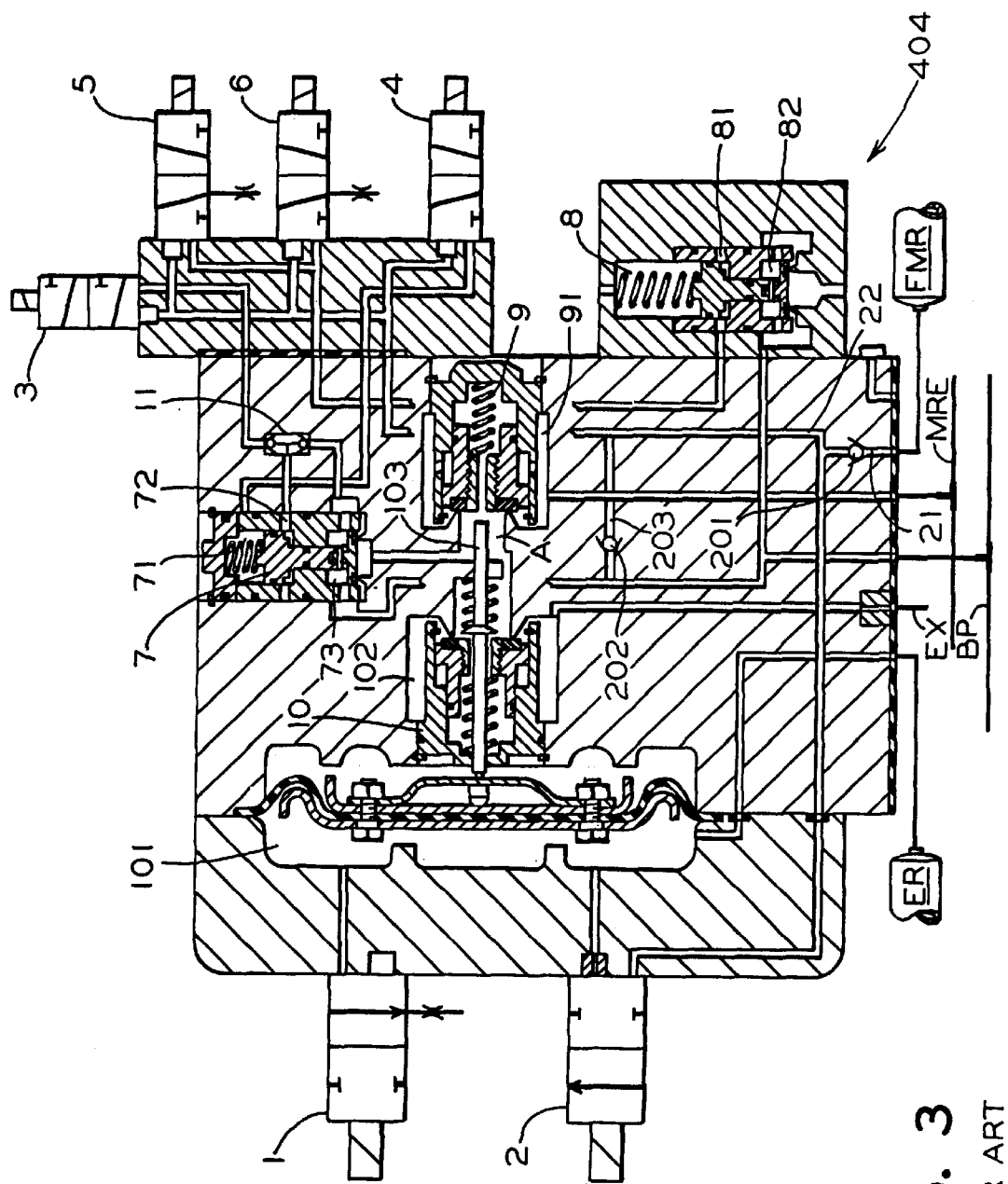
FIG. 3 is a cross sectional view of an improved brake pipe control portion according to the present invention.

FIG. 3 illustrates an improved brake pipe control portion. The prior art BP control portion shown in FIG. 2 suffers from a handicap that the improved BP control portion overcomes. Specifically, when the pressure of the filtered air flowing ultimately from the main reservoir of the locomotive falls, the FMR air within the control passage network flows back into the FMR pipe until the pressure difference between the control passage network and the main reservoir reduces to zero. Such lowering of the pressure within the control passage network compromises the operation of the pneumatic valves 7, 8, 9 and 10. Consequently, the BP control portion is impaired in its ability to operate as it is unable to properly control the brake pipe pressure under low main reservoir conditions.

Moreover, when the pressure within the FMR pipe falls below that in the equalizing reservoir, the brake pipe pressure may be lowered unintendedly. Such unintended reduction in brake pipe pressure occurs when the pressure within the equalizing reservoir falls below that requested by the position of the automatic brake handle. For example, when the automatic brake handle is moved to its release position, the brake control computer energizes the RMV 2 to ostensibly allow FMR air to flow into the equalizing reservoir and the ER control chamber 101. Under normal conditions, the exhaust valve 10 would then move to unseat supply valve 9 so that air from the MRE pipe would pressurize the brake pipe BP. With the pressure in the FMR pipe being lower than that in the equalizing reservoir, however, the flow of air is actually reversed, from the equalizing reservoir to the FMR pipe. Consequently, the brake pipe pressure drops rather than increases, with the railcar brakes applying rather than releasing as commanded via the automatic brake handle.

FIG. 3 illustrates the essential details of a presently preferred embodiment of the improved brake pipe control portion. The improvement includes a first check valve 201, a second check valve 202 and a connective passageway 203 added between the control passage network and the primary passage network. This improvement enhances the operation of the BP control portion under low main reservoir pressure conditions.

The first check valve 201 is incorporated into the control passage network between an inlet channel 21 of that network that is connected to the FMR pipe and a branched channel 22 of that network that is connected to the input ports of magnet valves 2, 3, 4, 5 and 6. The first check valve is a one way valve that prevents air from flowing from the branched channel 22 to the FMR pipe when pressure in the main reservoir is low relative to pressure in the control passage network.

Moreover, when the RMV 2 is energized, the first check valve 201 prevents the flow of air from the equalizing reservoir to the FMR pipe. The pressure within the equalizing reservoir can then be reduced only when the brake control computer energizes the AMV 1. Consequently, should the pressure in the FMR pipe drop rapidly, the pressure within the equalizing reservoir and brake pipe is safely controlled rather than reduced at an uncontrolled rate that is dependent on factors outside the control of the BP control portion and related EPIC® Brake Equipment System components. The improved BP control portion thus enhances the safety of the train by permitting the train to be stopped only in response to an intentional reduction of the brake pipe pressure.

The connective passageway 203 is bored into the BP control portion so as to interconnect the primary passage network and the branched channel 22 of the control passage network. The second check valve 202 is a one way valve that is incorporated into the connective passageway 203 as shown in FIG. 3. When pressure in the FMR pipe (and thus the branched channel) is low relative to pressure in the brake pipe BP, the second check valve 202 allows air to flow from the brake pipe BP via the primary passage network to the branched channel 22 of the control passage network. The first check valve 201 then prevents this influx of air from flowing into the FMR pipe. The first and second check valves thus serve to maintain pressure in the branched channel 22 of the control passage network when pressure in the locomotive main reservoir falls in relation to the pressure in the brake pipe. When the pressure is greater in the FMR pipe than the brake pipe BP, the second check valve 202 also prevents air from flowing into the primary passage network and thus the brake pipe BP from the branched channel 22.

Even if the main reservoir fails to provide FMR air at the control pressure ordinarily expected, these improvements ensure that the pneumatic valves 7 and 8 are operated so that the brake pipe pressure is optimally controlled. The two check valves 201 and 202 ensure that whichever of the brake pipe pressure and FMR pressure is greater that pressure will be present at the input ports to magnet valves 2, 3, 4, 5 and 6, the closing chamber 71 of charging cut-off valve 7 and the opening chamber 81 of emergency vent valve 8. As the lower of these two pressures will normally be approximately equal to, and not significantly less than, the brake pipe pressure, sufficient air pressure will be available to operate the pneumatic valves 7–10 in concert with the spring biases inherent in those pneumatic valves. Consequently, during low FMR pressure, the brake control computer will still control operation of the BP control portion in response to either movement of the automatic brake handle or a self initiated action by the brake control computer caused by a fault condition. The improvements not only raise the reliability of the BP control portion but also improve the reliability of the entire EPIC® Brake Equipment System.

The presently preferred embodiment for carrying out the invention has been set forth in detail according to the Patent Act. Those persons of ordinary skill in the art to which this invention pertains may nevertheless recognize various alternative ways of practicing the invention without departing from the spirit and scope of the following claims. Those of such skill will also recognize that the foregoing description is merely illustrative and not intended to limit any of the ensuing claims to any particular narrow interpretation.

Accordingly, to promote the progress of science and useful arts, we secure for ourselves by Letters Patent exclusive rights to all subject matter embraced by the following claims for the time prescribed by the Patent Act.

We claim:

1. An improvement to a brake pipe control device defining (i) a primary passage network that interconnects a brake pipe to a charging cut-off valve and an emergency vent valve housed in such brake pipe control device and (ii) a control passage network that interconnects a source of control pressure to cut-in, cut-out, release, application and emergency magnet valves used to cause operation of such charging cut-off and emergency vent valves and exhaust and supply valves of such brake pipe control device, said improvement comprising:
    (a) a first check valve incorporated into such control passage network between an inlet channel thereof that connects to such source and a branched channel thereof that connects to such release, cut-in, cut-out and emergency magnet valves, said first check valve disposed to prevent air from flowing to such source from such branched channel when pressure in such source is low relative to pressure in such branched channel;
    (b) a connective passageway defined in such brake pipe control device that interconnects such branched channel and such primary passage network; and
    (c) a second check valve incorporated into said connective passageway and disposed to allow air to flow from such primary passage network to such branched channel when pressure in such source is low relative to pressure in such brake pipe so as to maintain pressure in such branched channel thereby allowing such magnet valves during operation thereof to cause proper operation of such exhaust, supply, charging cut-off and emergency vent valves of such brake pipe control device even if such source fails to provide air at such control pressure ordinarily expected.

2. The improved brake pipe control device recited in claim 1 wherein:
    (a) such cut-in magnet valve is switchable between having an input port thereof being connected to an output port thereof wherein such branched channel is connected to a first inlet of a double check valve and having such output port thereof being connected to an exhaust port thereof wherein such first inlet of such double check valve is vented to atmosphere;
    (b) such cut-out magnet valve is switchable between having an input port thereof being connected to an output port thereof wherein such branched channel is connected to a closing chamber of a charging cut-off valve and having such output port thereof being connected to an exhaust port thereof wherein such closing chamber is vented to atmosphere;
    (c) such release magnet valve is switchable between having an input port thereof being connected to an output port thereof wherein such branched channel is connected to a control chamber of an exhaust valve and having such output port thereof being disconnected from such input port thereof;
    (d) such application magnet valve is switchable between having an output port thereof being connected to an exhaust port thereof wherein such control chamber of such exhaust valve is vented to atmosphere and having such output port thereof being disconnected from such exhaust port thereof; and
    (e) such emergency magnet valve is switchable between having an input port thereof being connected to an output port thereof wherein such branched channel is connected to an opening chamber of an emergency vent valve and having such output port thereof being connected to an exhaust port thereof wherein such opening chamber thereof is vented to atmosphere.

3. The improved brake pipe control device recited in claim 2 wherein:
    (a) such charging cut-off valve has (i) a vent chamber connected to both such primary passage network and a second inlet of such double check valve, (ii) such closing chamber connected to such output port of such cut-out magnet valve, and (iii) an opening chamber connected to an outlet of such double check valve, such that when such charging cut-off valve is opened such primary passage network via such vent chamber communicates with an intermediate chamber situated between such exhaust and such supply valves;
    (b) such emergency vent valve has (i) such opening chamber connected to such output port of such emergency magnet valve(s) and (ii) a vent chamber connected to such primary passage network, such that when such emergency vent valve is opened such primary passage network via such vent chamber is vented to atmosphere;
    (c) such supply valve has a supply chamber connected to a main reservoir pipe, such that when such supply valve is opened such main reservoir pipe via such supply chamber communicates with such intermediate chamber; and (d) such exhaust valve has (i) such control chamber connected to an equalizing reservoir and (ii) an exhaust chamber connected to atmosphere, such that when such exhaust valve is opened such intermediate chamber via such exhaust chamber is vented to atmosphere.

4. An improvement to a brake pipe control device defining (i) a primary passage network that interconnects a brake pipe to at least one pneumatic valve housed in such brake pipe control device and (ii) a control passage network that interconnects a source of control pressure to at least one magnet valve used to cause operation of such pneumatic valve(s), said improvement comprising:

(a) a first check valve incorporated into such control passage network between an inlet channel thereof that connects to such source and a branched channel thereof that connects to such magnet valve(s), said first check valve disposed to prevent air from flowing to such source from such branched channel when pressure in such source is low relative to pressure in such branched channel;

(b) a connective passageway defined in such brake pipe control device that interconnects such branched channel and such primary passage network; and (c) a second check valve incorporated into said connective passageway and disposed to allow air to flow from such primary passage network to such branched channel when pressure in such source is low relative to pressure in such brake pipe so as to maintain pressure in such branched channel thereby allowing such magnet valve(s) during operation thereof to cause proper operation of such pneumatic valve(s) of such brake pipe control device even if such source fails to provide air at such control pressure ordinarily expected.

5. The improved brake pipe control device recited in claim 4 wherein such pneumatic valve(s) include an exhaust valve, a supply valve, a charging cut-off valve and an emergency vent valve.

6. The improved brake pipe control device recited in claim 4 wherein such pneumatic valve(s) include an exhaust valve.

7. The improved brake pipe control device recited in claim 4 wherein such pneumatic valve(s) include a supply valve.

8. The improved brake pipe control device recited in claim 4 wherein such pneumatic valve(s) include a charging cut-off valve.

9. The improved brake pipe control device recited in claim 4 wherein such pneumatic valve(s) include an emergency vent valve.

10. The improved brake pipe control device recited in claim 4 wherein such magnet valve(s) include a cut-in magnet valve, a cut-out magnet valve, a release magnet valve, an application magnet valve and two emergency magnet valves.

11. The improved brake pipe control device recited in claim 4 wherein such magnet valve(s) include a cut-in magnet valve.

12. The improved brake pipe control device recited in claim 4 wherein such magnet valve(s) include a cut-out magnet valve.

13. The improved brake pipe control device recited in claim 4 wherein such magnet valve(s) include a release magnet valve.

14. The improved brake pipe control device recited in claim 4 wherein such magnet valve(s) include an application magnet valve.

15. The improved brake pipe control device recited in claim 4 wherein such magnet valve(s) include at least one emergency magnet valve.

16. The improved brake pipe control device recited in claim 5 wherein such magnet valve(s) include a cut-in magnet valve, a cut-out magnet valve, a release magnet valve, an application magnet valve and two emergency magnet valves.

17. The improved brake pipe control device recited in claim 4 wherein such magnet valve(s) include:

(a) a cut-in magnet valve switchable between having an input port thereof being connected to an output port thereof wherein such branched channel is connected to a first inlet of a double check valve and having such output port thereof being connected to an exhaust port thereof wherein such first inlet of such double check valve is vented to atmosphere;

(b) a cut-out magnet valve switchable between having an input port thereof being connected to an output port thereof wherein such branched channel is connected to a closing chamber of a charging cut-off valve and having such output port thereof being connected to an exhaust port thereof wherein such closing chamber is vented to atmosphere;

(c) a release magnet valve switchable between having an input port thereof being connected to an output port thereof wherein such branched channel is connected to a control chamber of an exhaust valve and having such output port thereof being disconnected from such input port thereof;

(d) an application magnet valve switchable between having an output port thereof being connected to an exhaust port thereof wherein such control chamber of such exhaust valve is vented to atmosphere and having such output port thereof being disconnected from such exhaust port thereof; and (e) at least one emergency magnet valve switchable between having an input port thereof being connected to an output port thereof wherein such branched channel is connected to an opening chamber of an emergency vent valve and having such output port thereof being connected to an exhaust port thereof wherein such opening chamber thereof is vented to atmosphere.

18. The improved brake pipe control device recited in claim 17 wherein such pneumatic valve(s) include:

(a) such charging cut-off valve having (i) a vent chamber connected to both such primary passage network and a second inlet of such double check valve, (ii) such closing chamber connected to such output port of such cut-out magnet valve, and (iii) an opening chamber connected to an outlet of such double check valve, such that when such charging cut-off valve is opened such primary passage network via such vent chamber communicates with an intermediate chamber situated between such exhaust and such supply valves;

(b) such emergency vent valve having (i) such opening chamber connected to such output port of such emergency magnet valve(s) and (ii) a vent chamber connected to such primary passage network, such that when such emergency vent valve is opened such primary passage network via such vent chamber is vented to atmosphere;

(c) such supply valve having a supply chamber connected to a main reservoir pipe, such that when such supply valve is opened such main reservoir pipe via such supply chamber communicates with such intermediate chamber; and (d) such exhaust valve having (i) such control chamber connected to an equalizing reservoir and (ii) an exhaust chamber connected to atmosphere, such that when such exhaust valve is opened such intermediate chamber via such exhaust chamber is vented to atmosphere.

* * * * *